US009145757B2

(12) United States Patent  
Williams

(10) Patent No.: US 9,145,757 B2  
(45) Date of Patent: Sep. 29, 2015

(54) FAILSAFE HYDROSTATIC VENT

(75) Inventor: Ronald Williams, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 475 days.

(21) Appl. No.: 13/468,475

(22) Filed: May 10, 2012

(65) Prior Publication Data

US 2013/0299183 A1 Nov. 14, 2013

(51) Int. Cl.
*E21B 34/10* (2006.01)
*F16K 17/32* (2006.01)
*F16K 31/56* (2006.01)

(52) U.S. Cl.
CPC .............. *E21B 34/101* (2013.01); *F16K 17/32* (2013.01); *F16K 31/56* (2013.01); *Y10T 137/773* (2015.04); *Y10T 137/86485* (2015.04)

(58) Field of Classification Search
CPC ..... E21B 34/101; F16K 17/042; F16K 17/32; F16K 31/56; Y10T 137/773; Y10T 137/86485
USPC .......................... 137/624.27; 251/73; 166/375
See application file for complete search history.

(56) References Cited

U.S. PATENT DOCUMENTS

| | | | |
|---|---|---|---|
| 1,715,504 A * | 6/1929 | Johnston et al. ............... 251/66 |
| 3,268,298 A * | 8/1966 | La Costa et al. .............. 422/111 |
| 3,800,736 A * | 4/1974 | Krohn ............................. 116/268 |
| 3,807,428 A * | 4/1974 | Watkins et al. ................. 137/155 |
| 3,891,182 A * | 6/1975 | Schwerin ........................ 251/297 |
| 3,910,223 A * | 10/1975 | Krohn ............................... 116/70 |
| 4,566,478 A * | 1/1986 | Deaton ........................... 137/112 |
| 5,343,955 A * | 9/1994 | Williams ........................ 166/386 |
| 5,836,337 A * | 11/1998 | Taylor ............................... 137/70 |
| 5,947,206 A | 9/1999 | McCalvin et al. |
| 6,328,062 B1 * | 12/2001 | Williams et al. ............ 137/527.2 |
| 6,513,594 B1 | 2/2003 | McCalvin et al. |
| 6,666,230 B1 * | 12/2003 | Taylor ........................ 137/624.27 |
| 7,225,877 B2 * | 6/2007 | Yater .............................. 166/344 |
| 7,565,916 B2 * | 7/2009 | Hart ................................ 137/557 |
| 7,694,742 B2 | 4/2010 | Bane et al. |
| 8,485,225 B2 * | 7/2013 | Veit .......................... 137/624.27 |
| 2006/0151177 A1 * | 7/2006 | Williams et al. ............... 166/363 |
| 2013/0056222 A1 * | 3/2013 | Smith et al. .................... 166/378 |

OTHER PUBLICATIONS

Examiner's Requisition received in corresponding Canadian application No. 2814901, dated Aug. 15, 2014, 3 pages.

* cited by examiner

*Primary Examiner* — Matthew W Jellett
(74) *Attorney, Agent, or Firm* — Blank Rome LLP

(57) ABSTRACT

An automatic vent valve and method for use is provided equalizing the pressure in at least two lines. A housing has a first piston that compresses a bias device when the second pressure source supplies sufficient pressure. Upon a sufficient reduction in pressure the first piston releases a second internally held coaxial piston to allow fluid to flow from a first pressure source towards a second pressure source, thereby equalizing the pressure between the two pressure sources.

13 Claims, 5 Drawing Sheets

FAILSAFE HYDROSTATIC VENT

BACKGROUND

Completion systems are well known in the art of well production, and can take many varied forms. Well completions typically have as common elements: a casing cemented in the well extending from a surface wellhead to the producing formation; a production tubing located concentrically inside the casing; and one or more well known devices, such as packers, that block, pack off, and seal the annulus formed between the casing and the production tubing, generally by means of a resilient sealing element.

Placement of the packer in this way directs the hydrocarbons from the producing formation into the production tubing and to the earth's surface. It is not uncommon, during the process of producing the hydrocarbons, for gas or other production fluids to accumulate in the annulus below the packer. If the amount of gas or other production fluids accumulated in the annulus below the packer becomes too excessive, the gas or other fluids can interfere with the production process. Accordingly, in those situations, it becomes desirable to be able to seal the wellbore so that fluids from the wellbore cannot pass through the wellbore to the surface.

To seal the wellbore against unwanted pressurized fluids from reaching the surface. Typically a safety valve is placed in the wellbore at some point where the operator desires to block unwanted pressurized fluid flow from reaching the surface. Typically the safety valve is a spring operated valve that is held open by a control line that provides hydraulic pressure from the surface. In the event of an emergency or other well condition where the safety valve must be actuated the control line pressure is removed and the spring will close the safety valve.

There has been a recent trend in the oil and gas industry whereby companies have extended their exploration efforts into greater and greater depths. This is especially true as it relates to exploration companies venturing into water depths greater than approximately 2,000 to 3,000 feet to drill for oil and gas, such as in the Gulf of Mexico. As a result of this trend, a problem has arisen with the operation of the safety valves of the type described above. The problem relates to the means by which the safety valve is actuated, namely, by connecting a control conduit from the earth's surface to the annulus vent valve, and then applying hydraulic fluid through the control conduit to a piston within the safety valve to overcome the force of a return spring and move a flow tube to open and close a closure member, such as a flapper, which blocks or permits fluid flow from the secondary packer bore into the annulus above the packer. More particularly, the problem relates to the column of hydraulic fluid in the control conduit extending between the earth's surface and the safety valve; this is sometimes referred to as the "hydrostatic head". Previously, it has been feasible to design a safety valve with a return spring capable of generating sufficient force to maintain the flapper in a closed position and overcome the force of the hydrostatic head. However, as wells are drilled to deeper and deeper depths, and as packers and safety valves are set at deeper and deeper depths, the length of the hydraulic control line necessarily increases, as does the force of the hydrostatic head. This requires the use of a larger and larger spring to overcome the increase in the hydrostatic head. It has been determined that, when a safety valve is set below certain depths, which is believed to be in the range of approximately 2,000 to 3,000 feet, it is no longer feasible to design a safety valve with a power spring large enough to overcome the hydrostatic head and close the safety valve in the case of an emergency.

Beyond this depth it has been preferred to use a balance line in conjunction with a spring in order to overcome the hydrostatic head in the control line and close the safety valve. However, typically a balance line may be run on the outside of the casing or other tubular and as such is susceptible to damage. In order to increase the operator's confidence that the safety valve has the capability to fail safely it is the object of this invention to provide a device that will allow the control line to automatically vent in the event of a balance line pressure failure.

SUMMARY OF THE INVENTION

An embodiment of the current invention provides for an outer housing having a bore. At one end of the housing a first pressure source is attached. At the other end of the housing a second pressure source is attached.

Typically, the pressure sources at least communicate with the control line pressure and the balance line pressure. A hollow piston is inserted into the bore so that the piston end is towards the balance line pressure source. The hollow piston is held in place to the housing by a retaining mechanism between the housing and the piston. Typically once the automatic vent is in place sufficient pressure is applied across the piston to release the retaining mechanism and allow the piston to move. However, a bias device applies force to one end of the piston while pressure from the balance line over the piston surface applies force in the opposite direction. As long as the two forces are balanced the piston does not move. The bias device is typically a spring however, pressurized gas or any other known biasing device could be utilized.

A hollow sleeve, attached to the housing at the opposite end from the balance line is inserted into the hollow piston. Inside of the sleeve is a second piston. The second piston is fixed in place to the sleeve by a lug or lugs. A ball or shear pin could also be used to lock the piston and sleeve together. The lugs typically are inserted radially through the sleeve into recesses formed around the circumference of the second piston. The lugs are sized so that as long as the first piston remains in its balanced position, between force from the pressure source and force from the bias device, then the lugs remain in place locking the second piston in position.

Releasable lugs are advantageous in that in certain instances, balance line pressure may be unchanged, but relatively high control line pressure may, if required, be utilized without venting the line. If a simple shear pin and piston or rupture disk were used as the safety vent, the balance line pressure and control line pressure would have to be maintained within a preset range in order to avoid automatically venting the lines.

In the event that balance line pressure is removed then the bias device moves the piston towards an end of the vent. As the piston is moved by the bias device a recess formed into the inner circumference of the piston allow the lugs that are inserted into the sleeve to move radially outward thereby freeing the second piston.

Once the second piston is free the end of the piston that is exposed to control line pressure is forced away from the control line pressure source thereby opening a fluid path that allows the control line pressure to either vent or flow towards the balance line pressure source.

It is envisioned that the vent valve could be oriented to automatically vent pressure from either the control line or the balanced depending upon the connection of the pressure sources. Additionally, it is also envisioned that multiple vent valves could be utilized in parallel with one another.

DETAILED DESCRIPTION OF EMBODIMENT(S)

Figure 1:
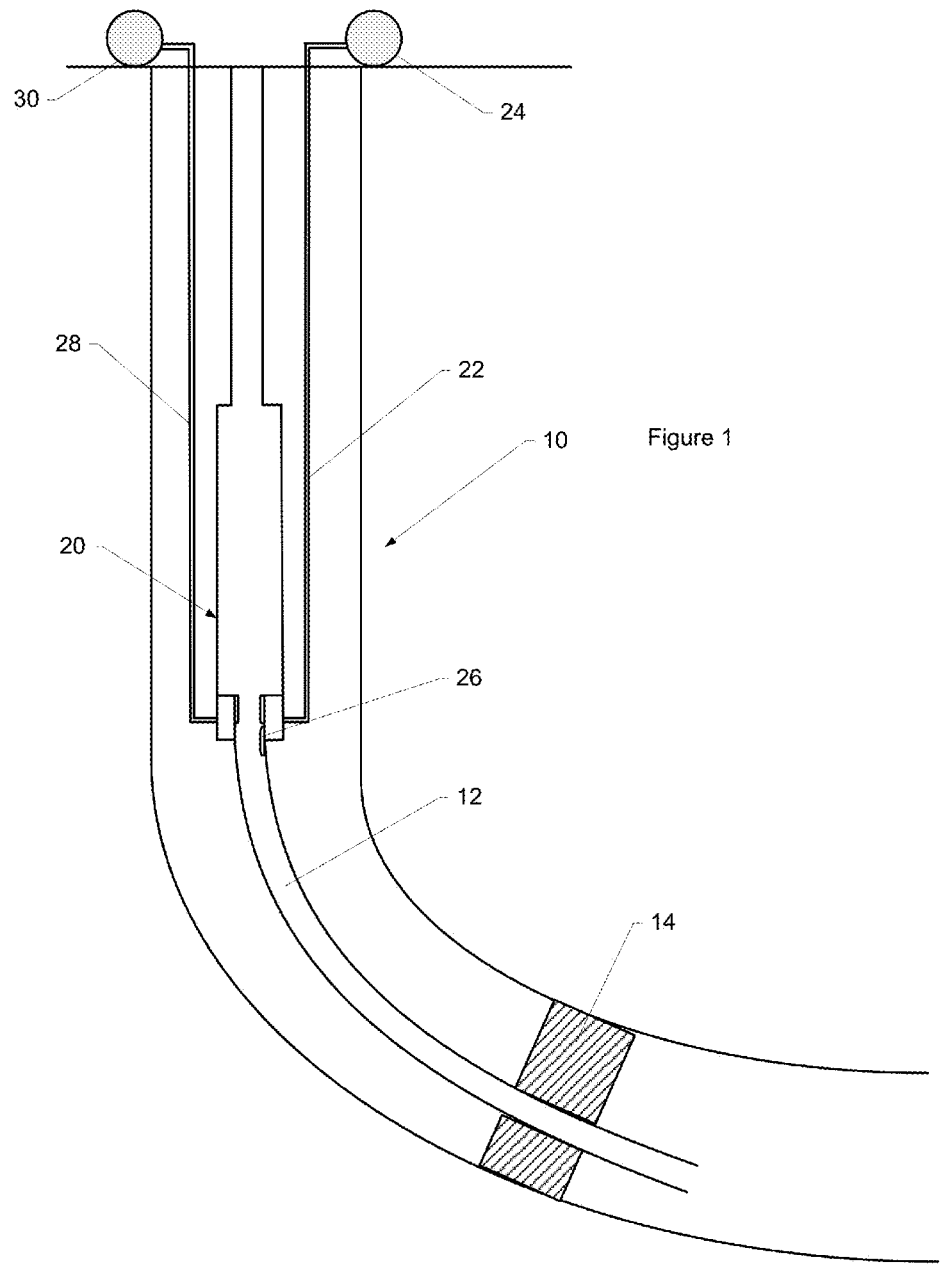
FIG. 1 depicts a prior art safety valve with a balance line in a well.

The description that follows includes exemplary apparatus, methods, techniques, and instruction sequences that embody techniques of the inventive subject matter. However, it is understood that the described embodiments may be practiced without these specific details. The use of the same reference numerals depict the same elements throughout the Figures.

FIG. 1 depicts, generally, a wellbore 10 safety valve 20. Placed inside of the wellbore 10 is a production tubular 12. The production tubular 12 is sealed to the wellbore 10 by packer 14. In certain instances pressure in the wellbore 10, below the packer 14, and inside of the production tubular 12, may exceed the safe limits of the production tubular 12. In order to avoid sending any hydrocarbons to the surface a safety valve 20 is typically placed in the production tubular 12 to prevent hydrocarbons from flowing through the production tubular 12 and out of the wellbore 10 in the event of an emergency.

In the safety valve 20 a flapper 26 is typically used to isolate fluids below the safety valve 20 from the tubular 12 above the safety valve 20. The flapper 26 may be held in the open position by hydraulic pressure in a control line 22. The control line 22 is pressurized from the surface by a pressure reservoir 24, although any sufficient pressure source would suffice. In the event that pressure is lost in the control line 22 a spring typically closes the flapper valve 26. In some deep wells should the control line 22 become damaged it may not be possible for the spring to close the flapper valve 26. In these instances the inability to close the safety valve 20 is due to hydrostatic head that may be due to fluid in the control line below the damaged section or it may be due to hydrostatic head exerted by seawater or other fluid that may have access to the interior of the control line 22 via the damaged section. In any event, the pressure in the control line 22 due to the hydrostatic head may become great enough that the spring is not able to overcome the force exerted through the control line resulting in a safety valve 20 that fails in the open condition.

One system that is typically used to provide additional backup in case of control line 22 failure is to add a balance line 28. The balance line 28 is pressurized from the surface by a pressure reservoir 30, although any sufficient pressure source would suffice. The balance line 28 provides a pressure source to oppose pressure exerted by the control line 22 in the event that the control line 22 is damaged.

One scenario that has been envisioned is the case where the balance line is damaged or the pressure in the balance line 28 otherwise bleeds down to a point at which the balance line 28 is not able to exert sufficient pressure to overcome the hydrostatic head that may exist should the control line 22 become damaged.

An automatic pressure vent could be used so that, in the event that the pressure in the balance line 28 reaches a preset minimum, would allow any pressure in the control line 22 to bleed down until it matches the pressure in the balance. The pressure in the control line would bleed off whether the pressure is due to hydrostatic pressure or pressure from the surface. As long as the pressure in the control line 22 and the pressure in the balance line 28 are within certain limits that depend upon available spring force, the spring can close the flapper 26.

Figure 2:
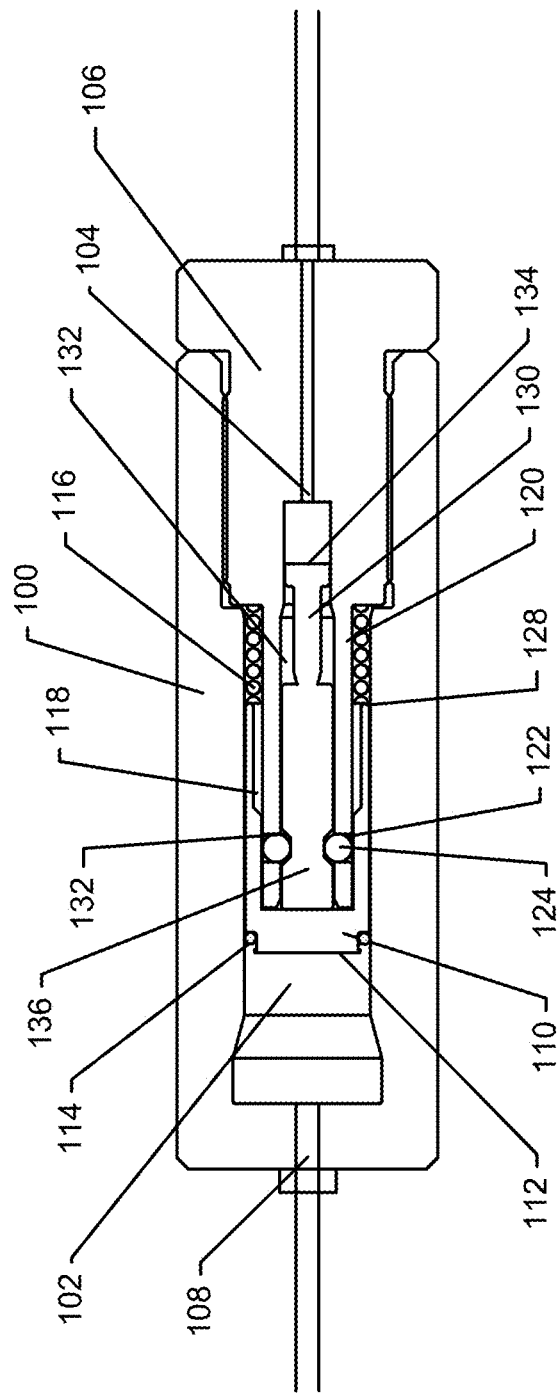
FIG. 2 depicts an automatic pressure vent valve.

In the automatic pressure vent valve depicted in FIG. 2, the valve shown has an outer housing 100. The outer housing has a bore 102 in the interior of the outer housing 100. A first pressure source 108 is attached to an end of the outer housing 100 and is in fluid communication with the bore 102 of the outer housing 100. A second pressure source 104 is via a bore in plug 106 that in this instance is threaded into an end of the outer housing 100 so that the pressure source 104 is in fluid communication with the bore 102 of the outer housing 100. In some instances the plug 106 may be formed as part of the outer housing 100.

The first pressure source 108 is typically connected to the balance line 28 by a "T" or other similar connection. The second pressure source 104 is connected to the control line 22 also by a "T" or other similar connection.

A sleeve 120 may be attached to, or may be, a part of the plug. Sleeve 120 has at least one port 122 in which a lug, ball, or other device is located. A ball 124 is depicted.

A first piston 110 is movably located in bore 102. The first piston 110 has a piston face 112 on a first end that is sealed to the outer housing 100 by a seal 114 such that when pressure is supplied via the first pressure source 108 the first piston 110 applies force to the second end 128 of the piston 110. The force applied by the first piston 110 through the second end 128 opposes the force exerted by the spring 116. When the pressure source 108 supplies sufficient pressure the spring 116 is compressed. When the spring 116 is compressed, the set position, a portion of the interior of the piston 110 provides support for the ball 124.

As long as the ball 128 is supported by the interior wall of the first piston 110 the second piston 130 is locked in position. The second piston 130 has a groove 132, typically circumferential, formed around its exterior. The groove 132 interacts with the ball or balls 124 to lock the second piston in position as long as the balls 124 are supported by the interior wall of the first piston.

The second piston 130 is movably located in interior 132 of sleeve 120. The second piston 130 has a piston face 134 on a second end that is sealed to the outer housing 100 or plug 106 such that when pressure is supplied via the second pressure source 104 the second piston 130 applies force to the first end 136 of the second piston 130. The force applied by the second piston 130 through the first end 136 is exerted against balls 124. In certain configurations the burst rating of the valve, fittings, or other attached devices may be exceeded without unlocking the balls 124 and allowing the second piston 130 to shift.

Figure 3:
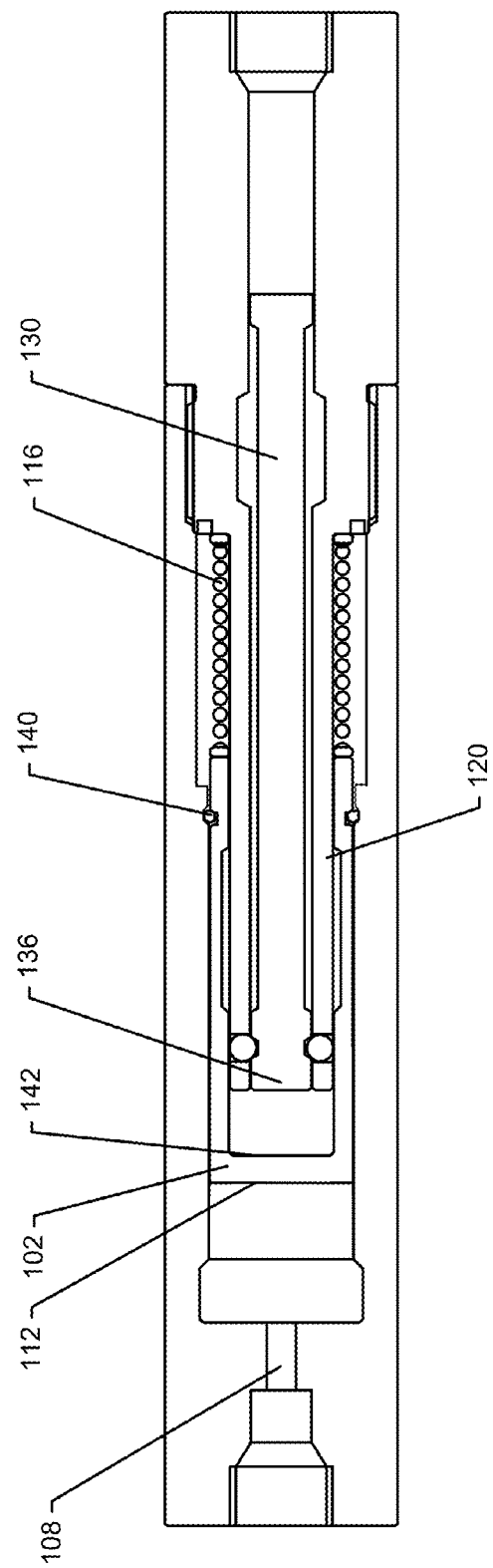
FIG. 3 depicts the run-in hole condition of the vent valve.

In operation it is envisioned that the pressure vent valve will have three stages. FIG. 3 depicts the run-in hole stage. In the run-in stage pressure may be supplied from the balance line 28 via the first pressure source 108. However, it is anticipated that the pressure supplied will not be sufficient to overcome the locking device 140. During the run-in stage the locking device 140 is meant to prevent the first piston 102 from shifting in any direction and prematurely tripping the automatic vent valve. The retaining device could be a shear pin, a c-ring or any other known device to releasably lock the first piston 102 in position. The first piston 102 is situated so that pressure applied from the first pressure source 108 can act against the piston face 112 to shear the locking device 140 thereby compressing the spring 116 and seating the reverse face 142 of first piston face 112 against an end of the sleeve 120 and against the first end of the second piston 130.

Figure 4:
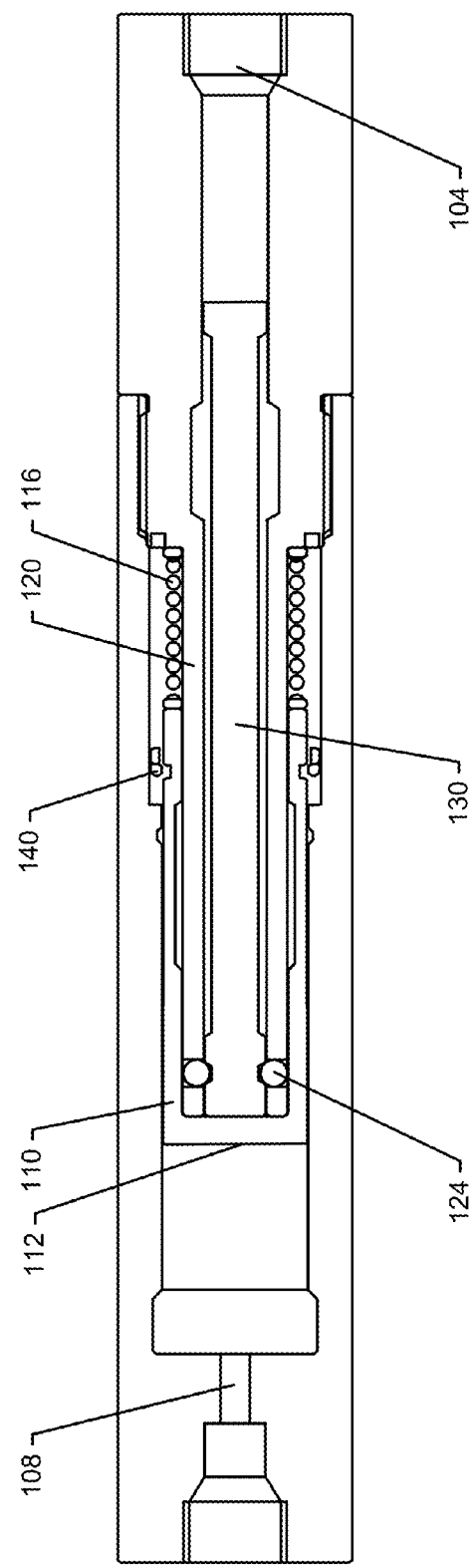
FIG. 4 depicts the vent valve in the armed stage.

An automatic vent valve in the armed stage, after sufficient pressure has been applied to the piston face 112 so that the locking device 140 is sheared, depicted in FIG. 4. In the armed stage, the first piston 110 has shifted away from the first pressure source 108 until the first piston 110 seats upon the sleeve 120. As the first piston 110 shifts away from the first pressure source 108 it also compresses the spring 116. With the first piston 110 shifted away from the first pressure source 108 the interior wall of the first piston 110 continues to support the balls 124 and thereby maintains the second piston in a locked position. As long as there is sufficient pressure in first pressure source 108 to allow the first piston in 110 to exert sufficient force to overcome the force exerted by the spring, gas, or other bias device 116, then the first piston 110 will remain in the armed position, locking the second piston 130 in place, and thereby preventing the pressure in the first pressure source 108 and the pressure in the second pressure source 104 from equalizing.

Figure 5:
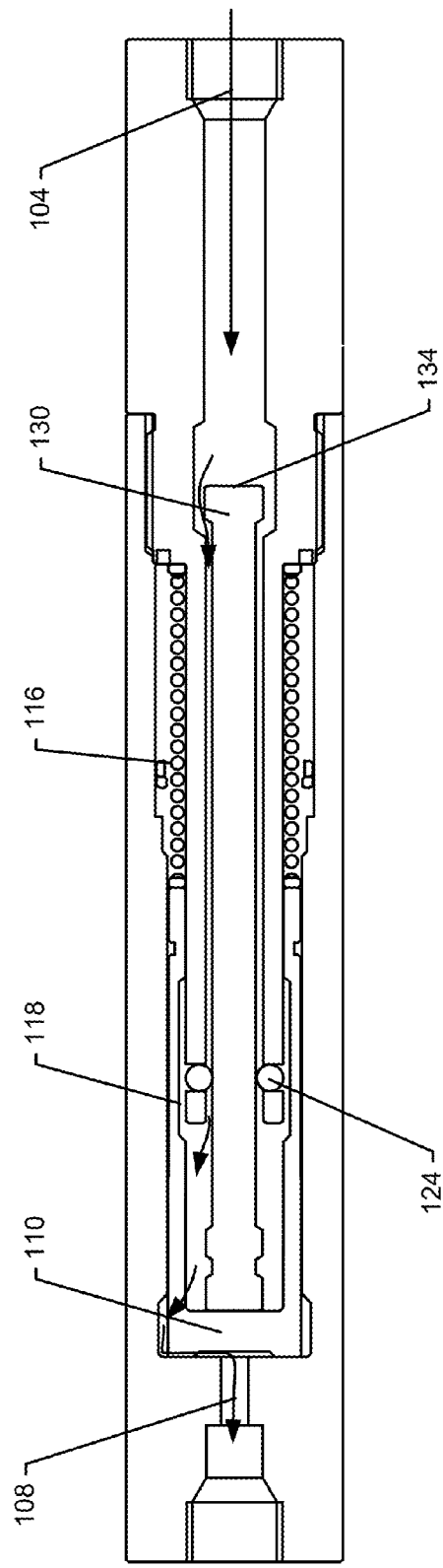
FIG. 5 depicts the vent valve in the tripped stage.

FIG. 5 depicts an automatic vent valve in the tripped position. In the event that the balance line 28 is damaged so that pressure in the balance line is reduced, the pressure at the first pressure source 108 will be reduced. When the pressure in the first pressure source 108 reaches a predetermined low pressure, the force exerted by the spring 116 will overcome the force exerted by the pressure on the first piston 110 causing the first piston 110 to shift towards the first pressure 108. As the first piston 110 shifts, a recess 118 formed in a portion of the interior wall of the first piston 110 will be moved into position over the balls 124. When the balls 124 are no longer supported by the interior wall of the first piston 110 then the balls will move radially outward unlocking the second piston 130. Pressure from the second pressure source 104 will act upon the second piston face 134 to exert a force causing the second piston 130 to shift away from the second pressure source 104. As the second piston 130 shifts away from the second pressure source 104 a fluid flow path is opened between the first pressure source 108 and the second pressure source 104. As depicted by the arrows fluid may flow between the first pressure source 108 and the second pressure source 104 until the pressure at both points and in the control line 22 and the balance line 28 are equalized. Once the pressure in both lines has equalized any hydrostatic head or other pressure that exists in the control line 22 is countered by the now equal pressure in the balance line 28 and the spring may close the flapper valve 26 in the safety valve 20.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. The method of equalizing pressure between a control line and a balance line of a hydraulically controlled downhole safety valve, the method comprising:

supplying pressure from a first pressure source to a face of a first piston thereby causing a force opposing shifting of the first piston from a first piston first position to a first piston second position, said shifting being caused by a biasing device acting on the first piston; and supplying pressure from a second pressure source to a face of a second piston thereby causing a force urging the second piston from a second piston first position to a second piston second position, the second piston being retained in place by a lug supported by an interior surface of the first piston;

wherein:

a reduction in said pressure from the first pressure source allows the biasing device to overcome the force opposing shifting of the first piston from the first piston first position to the first piston second position, thereby shifting the first piston from the first piston first position to the first piston second position, withdrawing support for the lug, and unlocking the second piston, thereby allowing the force urging the second piston from the second piston first position to the second piston second position to shift the second piston from the second piston first position to the second piston second position;

unlocking the second piston includes removing support for the lug disposed within a port of the second piston as a result of the shifting of the first piston; and said shifting of the first and second pistons establishes a fluid flow path between the control line and the balance line.

2. The method of claim 1 wherein the first pressure source is the balance line and the second pressure source is the control line.

3. The method of claim 1 wherein the biasing device is a spring.

4. The method of claim 1 wherein the biasing device is a pressurized gas.

5. The method of claim 1 wherein with the first piston in the first piston first position and the second piston in the second piston first position the lug interacts with a recess in the second piston to retain the second piston in the second piston first position, thereby preventing fluid communication between the first pressure source and the second pressure source.

6. The method of claim 1 wherein with the first piston in the first piston second position the lug interacts with a recess in the first piston to allow the second piston to move from the second piston first position to the second piston second position, thereby allowing fluid communication between the first pressure source and the second pressure source.

7. The method of claim 1 wherein the second pressure source acting upon the first piston first end compresses the biasing device.

8. A downhole assembly comprising:

a wellbore safety valve having a flapper to isolate fluids below the safety valve, the flapper being biased toward a closed position by a spring and held in an open position by a hydraulic control line;

a balance line configured to oppose pressure exerted by the control line in the event that the control line is damaged; and an automatic pressure vent valve coupled to the hydraulic control line and the balance line and configured to allow excess pressure in the control line to bleed down to match the pressure in the balance line, the automatic pressure vent valve comprising:

a first piston disposed within a bore of an outer housing, the first piston having a face in fluid communication with the balance line and a recess formed in a portion of a longitudinal partial bore of the first piston;

a biasing device imposing a force on the first piston opposing a force resulting from pressure in the balance line acting on the first piston face;

a sleeve affixed to the outer housing, inserted into the longitudinal partial bore of the first piston, and having a port formed through a wall thereof;

at least one lug disposed within the port and supported by an interior of the longitudinal partial bore of the first piston; and a second piston disposed at least partially within the sleeve and having a face in fluid communication with the control line;

wherein balance line pressure being reduced below control line pressure allows the biasing device to shift the first piston such that the at least one lug moves radially outwardly into the recess, thereby allowing a force resulting from pressure in the control line to move the second piston so as to establish fluid communication between the control line and the balance line through the sleeve.

9. The downhole assembly of claim 8 wherein the biasing device is a spring.

10. The downhole assembly of claim 8 wherein the biasing device is a pressurized gas.

11. The downhole assembly of claim 8 wherein prior to shifting the first piston the lug interacts with a recess in the second piston to retain the second piston thereby preventing fluid communication between the control line and the balance line.

12. The downhole assembly of claim 8 wherein the balance line pressure acting upon the first piston face compresses the biasing device.

13. The downhole assembly of claim 8 wherein the lug is a ball.

* * * * *